Figure 1:
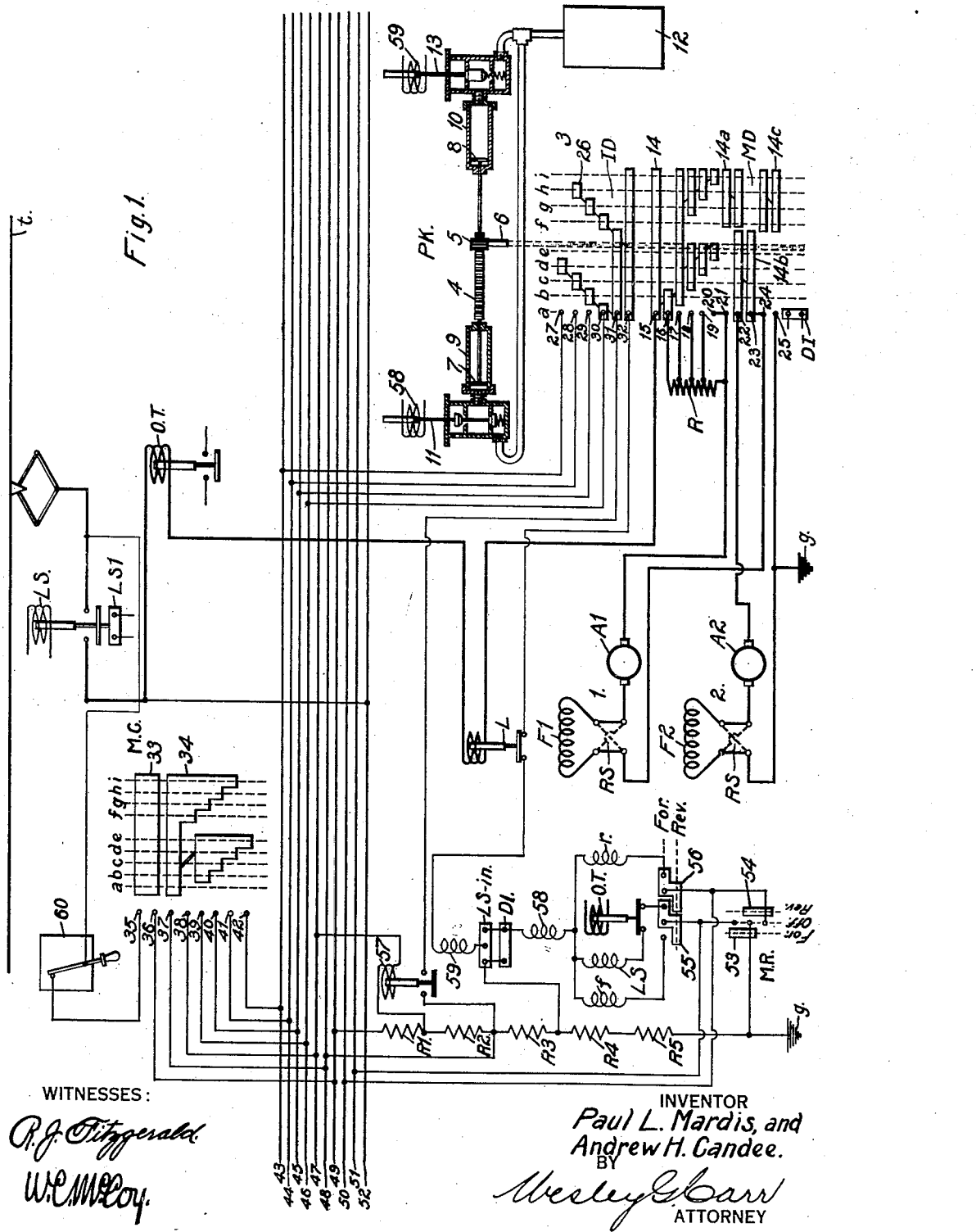

UNITED STATES PATENT OFFICE.

PAUL L. MARDIS, OF ALTOONA, AND ANDREW H. CANDEE, OF PITTSBURGH, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,291,583.  Specification of Letters Patent.  Patented Jan. 14, 1919.

Application filed September 9, 1916. Serial No. 119,227.

*To all whom it may concern:*

Be it known that we, PAUL L. MARDIS, a citizen of the United States, and a resident of Altoona, in the county of Allegheny and State of Pennsylvania, and ANDREW H. CANDEE, a citizen of the United States, and a resident of Pittsburgh, in the county of Allegheny and State of Pennsylvania, have invented a new and useful Improvement in Control Systems, of which the following is a specification.

Our invention relates to systems of control for electric vehicles and particularly to systems of control for operating electric vehicles in trains.

One object of our invention is to provide a control system that shall comprise a master controller for governing the operation of a plurality of interlock and control drums, a number of train-line conductors for connecting the master controller to the various interlock drums and electro-pneumatic devices which are jointly controlled by the master controller and the respective interlock drums for moving the respective interlock and main drums in a step-by-step manner to operate the motors of the system in series and in parallel relation.

Another object of our invention is to provide an automatic control system of the above indicated character that shall comprise a minimum number of train-line conductors for operating a train of electric vehicles without false operation of various main controllers contained therein by the completion of incorrect circuits.

More specifically, our invention consists in a control system for operating a number of articulated electric vehicles, each of which is provided with a number of electric motors, a main controller comprising an interlock drum and a main drum and an electro-pneumatic device for operating the main controller in a step-by-step manner. A master controller for governing the operation of the various main controllers is connected to the interlock drums by a number of train-line conductors. One of said train-line conductors is provided with a number of relays for connecting the same to the various interlock drums and for governing the movement of the main controller from the last series position to the first parallel position.

In systems of this character, now in service, a separate train-line conductor is required for each main controller, in order to effect a movement of the latter from the last series position to the first parallel position without forming any false or incorrect circuits. In case all the main controllers are connected together by a single train-line conductor, in order to effect transition from the last series position to the first parallel position of the controllers, it is evident that the main controllers are permanently connected together during all series positions, and one slow-acting main controller may form false circuits through the remaining main controllers.

Figure 2:
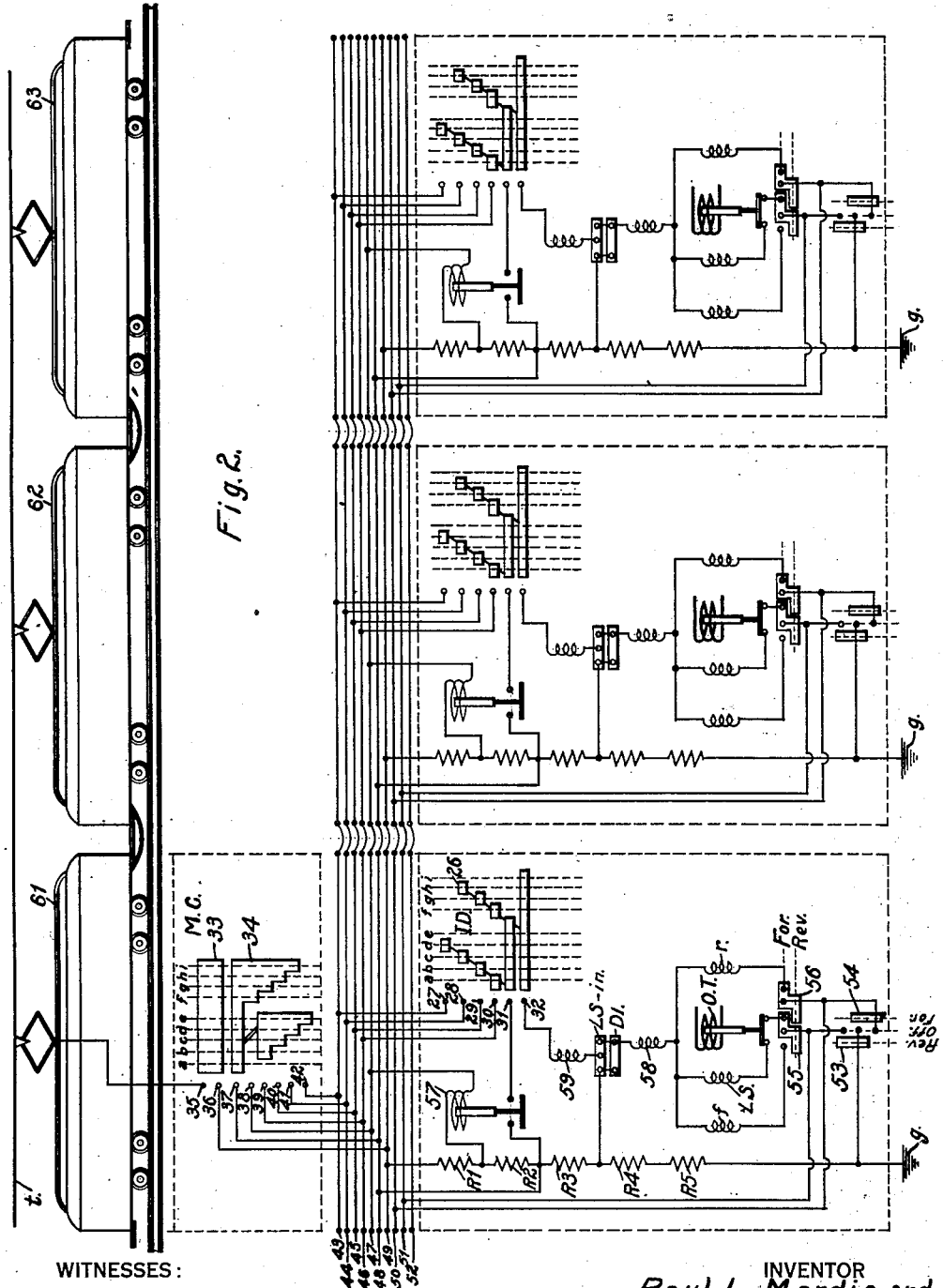
Figure 3:
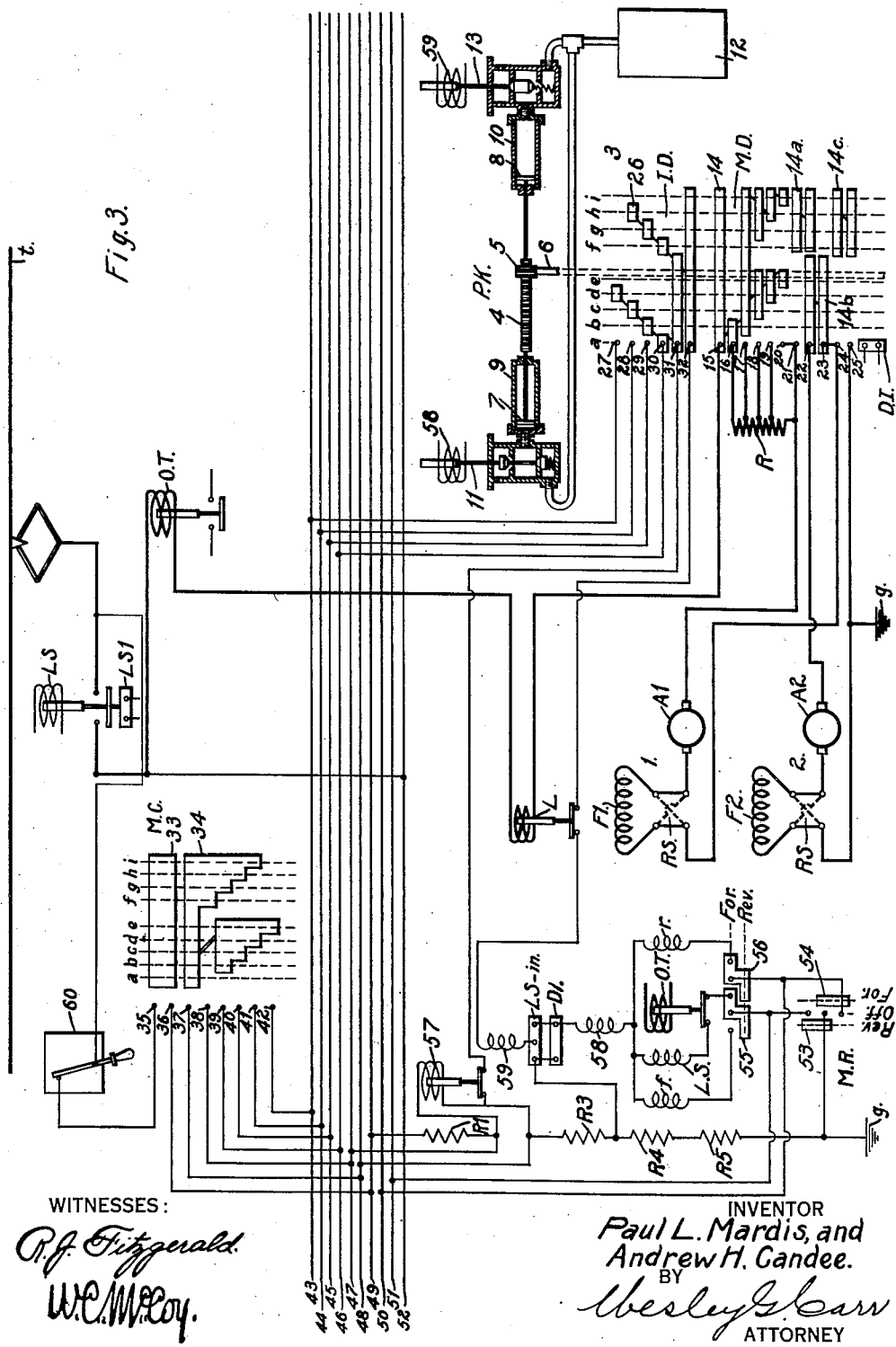

In the accompanying drawings, Figure 1 is a diagrammatic view of a control system embodying our invention; Fig. 2 is a diagrammatic view of the control circuits for operating a train of electric vehicles, and Fig. 3 is a diagrammatic view of a modification of our invention.

Referring to Fig. 1 of the drawings, two motors 1 and 2, respectively comprising field windings F1 and F2 and armatures A1 and A2, are adapted to be connected across a supply circuit comprising conductors $t$ and $g$ and to be controlled by means of a master controller MC, and a main controller 3. The main controller 3, comprising an interlock drum ID and a main drum MD, is adapted to be operated in a step-by-step manner by means of an electro-pneumatic apparatus PK.

The electro-pneumatic apparatus PK embodies a ratchet bar 4 which meshes with a pinion 5 that is mounted on the shaft 6 of the main controller 3. To the respective ends of the ratchet bar 4 are connected pistons 7 and 8 which operate within differential air cylinders 9 and 10. A standard magnet-valve 11 is provided for governing the admission of air pressure from a source of supply 12 to the cylinder 9, and an inverted magnet-valve is provided for governing the admission of air pressure from the source 12 to the cylinder 10. In the normal or released positions of the magnet-valves 11 and 13, as shown in Fig. 1 of the drawings, the cylinder 10 is connected to the air supply source 12 while the cylinder 9 is disconnected from the same and in communication with the atmosphere.

The main drum MD comprises movable contact segments 14, 14a, 14b and 14c, which are adapted to engage contact fingers 15 to 25, inclusive, when moved to positions a to i, inclusive, to connect the motors 1 and 2 in series and in parallel-circuit relation across the supply conductors t and g and to exclude a resistor R from the circuit of the motors. The interlock drum ID comprises a movable contact segment 26 which is adapted to engage contact fingers 27 to 32, inclusive, when moved to positions a to i, inclusive, for a purpose to be explained later.

The master controller MC comprises movable contact segments 33 and 34 which are adapted to be moved through positions a to i, inclusive, to engage contact fingers 35 to 42, inclusive, to complete circuits through a number of train-line conductors 43 to 52, inclusive, a plurality of resistors R1 to R5, inclusive, and the interlock drum ID, for a purpose to be explained later.

A reversing switch RS of a well known type is provided for reversing the direction of rotation of the motors 1 and 2. The reversing switch RS is controlled by a master reverser MR, comprising contact segments 53 and 54, which control the energization of the reversing coils f and r through contact segments 55 and 56 in a well known manner. The coil of a limit switch L and the coil of an overload trip switch OT are inserted in the circuit of the motors 1 and 2. The coils of a line switch LS and a relay 57, a coil 58 for operating the magnet-valve 11, and a coil 59 for operating the magnet-valve 13 are inserted in the circuit of the master controller MC. The line switch LS is provided with an interlock switch LS—in, and the main controller 3 is provided with an interlock switch D1, for a purpose to be explained later. A switch 60 is provided for connecting the master controller MC across the supply conductors t and g.

In Fig. 2 of the drawings, the control circuits of electric cars 61, 62 and 63, are shown connected to one set of train-line conductors and controlled by one master controller MC. The reference characters used in this figure correspond to those used in Fig. 1, and it is believed that the detailed description to be given in explaining Fig. 1 will be sufficient for a complete understanding of the circuits disclosed in Fig. 2.

As the modification disclosed in Fig. 3 differs from the system disclosed in Fig. 1 in only a few circuit connections, reference characters corresponding to those used in Fig. 1 will be used in this figure. In Fig. 3 the coil of the relay 57 is shown as inserted in place of the resistor R2 which is illustrated in Fig. 1 of the drawings.

With the system in the position shown in Fig. 1 of the drawings and the master reverser moved to its forward position, the operation of the motors 1 and 2, when the master controller is moved through its positions a to i, inclusive, may be as follows: when the master controller is moved to position a, a circuit is completed from the supply conductor t through switch 60, contact fingers 35 and 36, which are bridged by the contact segment 33, train line conductor 49 and the resistors R1 to R5, inclusive, to the ground conductor g. A circuit is completed around the resistors R4 and R5, which may be traced from one terminal of the resistor R4 through the interlock switch D1, the coil 58 of the magnet-valve 11, coil of the line switch LS, overload trip switch OT and the contact segments 55 and 53 to the ground conductor g. Thus, the line switch LS is operated, and the motors 1 and 2 are connected, in series, across the supply conductors t and g by a circuit which may be traced from the supply circuit t, through the line switch LS, coil of the overload trip switch OT, coil of the limit switch L, contact fingers 15 and 16, which are bridged by the contact segment 14, resistor R, motor 1, contact fingers 22 and 23, which are bridged by the contact segment 14b, and motor 2 to the ground conductor g. The motors 1 and 2 are thus connected in series with the resistor R across the supply conductors t and g.

When the main controller 3 is in position a, the circuit for the coil of the line switch LS, the coil 58 and one of the coils f and r is completed through the interlock switch D1 of the main controller. In positions b to i, inclusive, of the main controller, the interlock switch D1 is replaced by the interlock switch LS—in which establishes a holding circuit through the coil 58 and the coil of the line switch LS when the line switch is operated.

When the master controller is moved to position b, a circuit is completed around the resistor R3, which may be traced from one terminal of the resistor R3, through the train-line conductor 48, contact fingers 37 and 39, which are bridged by the contact segment 34, train-line conductor 46, contact fingers 30 and 32, which are bridged by the contact segment 26, limit switch L, coil 59 of the magnet-valve 13 and interlock switch LS—in to the other terminal of the resistor R3. The coil 59 of the magnet-valve 13 is energized and, as the circuit previously traced around the resistors R4 and R5 is closed in all positions of the master controller by the interlock switch D1 or the interlock switch LS—in, the coils 58 and 59 of the magnet-valves 11 and 12 are now simultaneously energized. The magnet-valve 11 thus connects the cylinder 9 to the air supply source 12 and the magnet-valve 13 releases the cylinder 10 of the air pressure contained therein, so that the piston 7, acting on the ratchet 4 and the pinion 5, moves the main controller 3 from position $a$ to position $b$. In position $b$ of the main controller 3, the circuit of the coil 59 of the magnet-valve 13 is broken, by reason of the disengagement of the contact segment 26 with the contact finger 30. Thus, the main controller 3 is prevented from moving to position $c$, by reason of the magnet-valve 13 being released to admit air pressure to the cylinder 10. In position $b$ of the main controller, a section of the resistor R is excluded from the circuit of the motors 1 and 2 by the contact segment 14 bridging the contact fingers 16 and 17.

When the master controller is moved to positions $c$, $d$ and $e$, circuits are formed, in a like manner, through the coil 59 of the magnet-valve 13 for intermittently operating the electro-pneumatic apparatus PK to operate the main controller through its positions $b$, $c$, $d$ and $e$ and exclude the resistor R from the circuit of the motors 1 and 2.

In moving the master controller from position $e$, the last series position, to position $f$, the first parallel position, the contact segment 34 engages the contact finger 38 to connect the coil of the relay 57 across the resistor R2. The relay 57 completes a circuit through the coil 59 of the magnet-valve 13, which may be traced from one terminal of the resistor R3, through the interlock switch LS—in, coil 59, limit switch L, contact fingers 31 and 32, which are bridged by the contact segment 26 and the relay 57 to the other terminal of the resistor R3. The coil of the magnet-valve 13 is now energized and the main controller 3 moves to position $f$ which is its first parallel position. Thus, the motors 1 and 2 are connected in parallel across the supply conductors $t$ and $g$ by a circuit, which may be traced from the conductor $t$, through the line switch LS, coil of the overload trip switch OT, coil of the limit switch L, and contact fingers 15 and 17, which are bridged by the contact segment 14, to the resistor R where the circuit divides; one branch extending through the motor 1, contact fingers 24 and 25 and contact segment 14c to the ground conductor $g$, and the second branch extending through the contact segment 14a, contact finger 22 and the motor 2 to the ground conductor $g$.

In positions $g$, $h$ and $i$ of the master controller, the coil 59 of the magnet-valve 13 is intermittently operated, as above described in positions $a$ to $e$, inclusive, to advance the main controller 3 through its parallel positions $g$, $h$ and $i$ and exclude the resistor R from the circuit of the motors 1 and 2.

In the system illustrated in Fig. 3, the relay 57 is energized in positions $a$, $b$, $c$, $d$ and $e$ of the master controller, by reason of having its energizing coil inserted in series with the resistors R1, R3, R4 and R5. Between positions $e$ and $f$ of the master controller, the contact finger 38 engages the contact segment 34 to short-circuit the coil of the relay 57 and thus release the relay, so as to close a circuit from one terminal of the resistor R3, through the relay 57, contact fingers 31 and 32, which are bridged by the contact segment 26, limit switch L, coil 59 and the interlock switch LS—in to the other terminal of the resistor R3. The coil 59 of the magnet-valve 13 is thus energized to effect the transition of the main controller 3 from position $e$ to position $f$. From the above, it may be noted that the sole difference between the system disclosed in Fig. 1 and the system disclosed in Fig. 3 consists in the connections of the relay 57 to the master controller MC. In the system illustrated in Fig. 1, the relay 57 is operated by the master controller to complete a circuit through the coil 59 of the magnet-valve 13 when the master controller is moved from position $e$ to position $f$. In the system illustrated in Fig. 3, the relay 57 is released to complete a circuit through the coil 59 of the magnet-valve 13 when the master controller is moved from position $e$ to position $f$.

Referring to Fig. 2 of the drawings, if the contact fingers 31 of the various interlock drums were connected directly to the train-line conductor 47 without the interposition of the relay 57, the movable contact segments 26 of the various interlock drums would be permanently connected together in position $a$, $b$, $c$ and $e$. However, with the contact segments 26 permanently connected together, undesirable circuits would be formed whenever the interlock drums operate at different rates. A slow-acting main controller will supply energy through the train-line conductor 47 to the contact segments 26 of the various interlock drums and through the various contact fingers 32 to the coils 59 of the magnet-valves 13, thus effecting a false operation of the various main controllers. With relays 57 interposed between the train-line conductor 47 and the various interlock drums, a false operation of the main controllers, as above set forth, is impossible.

We do not wish to be restricted to the specific control circuits or the arrangement of parts herein set forth, as various modifications thereof may be made without departing from the spirit and scope of our invention. We desire, therefore, that only such limitations shall be imposed as are indicated in the appended claims.

We claim as our invention:

1. In a system of control, the combination with a plurality of sets of motors, a main and an interlock control drum for each set of motors, electro-pneumatic devices controlled by the interlock drums for moving each main drum to operate the motors in series and in parallel relation, and a master controller, of a plurality of train-line conductors for connecting the master controller to said interlock drums, one of said train-line conductors controlling the movement of all the main and the interlock drums from the last series position to the first parallel position.

2. In a system of control, the combination with a plurality of connected electric vehicles, a master controller, a plurality of propelling motors for each of said vehicles, controlling means disposed on each of said vehicles for governing the operation of the motors thereof in series and in parallel relation, and a plurality of train-line conductors for connecting the master controller to the various controlling means, of means comprising one of said train-line conductors and a number of relays for preventing the operation of the motors of the various vehicles in parallel relation until the master controller has been moved to its first parallel position.

3. In a system of control, the combination with a number of articulated electric vehicles, a plurality of propelling motors for each of said vehicles, controlling means disposed on each of said vehicles for controlling the propelling motors thereof, a master controller, and a plurality of train-line conductors for connecting the master controller to the various controlling means, of means comprising one of said train-line conductors and a number of relays for governing the operation of the various controlling means when the motors are changed from series to parallel relation.

4. In a system of control, the combination with a plurality of sets of motors, a main and an interlock control drum for each set of motors, means controlled by the interlock drums for moving the main drums to operate the motors in series and in parallel relation, and a master controller for controlling the operation of the main and the interlock drums, of a plurality of train-line conductors for connecting the master controller to said interlock drums, one of said train-line conductors controlling the movement of all the main and the interlock drums from the last series position to the first parallel position, and means for preventing the movement of the main and the interlock drums from the last series position to the first parallel position until the master controller is moved to its first parallel position.

5. In a system of control, the combination with a plurality of sets of motors, a main and an interlock control drum for each set of motors, means controlled by the interlock drums for moving the main drums to operate the motors in series and in parallel relation, and a master controller, of a plurality of train-line conductors for connecting the master controller to said interlock drums, one of said train-line conductors controlling the movement of all the main and the interlock drums from the last series position to the first parallel position, and means comprising relays connected to said last mentioned train-line conductor for preventing the movement of the interlock and the main drums from the last series position to the first parallel position until the master controller has been moved to its first parallel position.

6. In a system of control, a master controller, a plurality of main and interlock control drums, a plurality of train-line conductors for connecting said master controller to the various interlock drums, a plurality of motors adapted to be operated in series and in parallel relation by said main control drums, and means governed by the master controller and the interlock drums for moving the interlock and the main drums in a step-by-step manner, of means comprising one of said train-line conductors and a plurality of relays connected thereto for preventing the movement of the interlock and the main drums from the last series to the first parallel position until the master controller has been moved to a parallel position.

7. In a system of control, the combination with a train of electric vehicles a plurality of motors for propelling each of said vehicles, main controllers for governing the operation of the motors in series and in parallel relation, and a master controller for governing the operation of the main controllers, of a train-line conductor having relays inserted therein for governing the movement of each main controller when moving from the last series to the first parallel position and for preventing false circuits being formed through the main controllers during the various series positions.

8. In a system of control, the combination with a train of electric vehicles, a plurality of motors for propelling each of said vehicles, main controllers for governing the operation of the motors in series and in parallel relation, pneumatic devices for operating said main controllers, and a master controller for governing the operation of said pneumatic devices, of means comprising a train-line conductor connected to the various drum controllers by a relay for preventing the operation of the motors in parallel relation until the master controller is moved to a parallel position.

9. In a system of control for operating a plurality of electric vehicles, the combination with a supply circuit, a plurality of motors adapted to be connected to said supply circuit, a master controller, a plurality of interlock control drums for controlling the operation of said motors, and a plurality of train-line conductors for connecting the master controller to the interlock drums, of automatic means for operating said interlock drums in accordance with the movement of the master controller, and relays connected across one of said train lines and the interlock drums for effecting a predetermined movement of the drums and for preventing false operation of the latter.

10. In a system of control for operating a plurality of electric vehicles, the combination with a supply circuit, a plurality of motors adapted to be connected to said supply circuit, a master controller and a plurality of interlock drums, of means comprising a plurality of train-line conductors for governing the operation of the interlock drums in accordance with the movement of the master controller and a relay connected to each interlock drum for preventing false operation thereof and for effecting the movement of the interlock drum from the last series position to the first parallel position.

11. In a system of control, the combination with a master controller, a plurality of interlock control drums, and a plurality of train-line conductors for connecting the master controller to said interlock control drums, of means controlled by said master controller for operating said drums through a number of positions, and means comprising one of said train-line conductors and a number of relays for governing the transition of said interlock drums between two positions and for preventing a slow acting interlock drum from effecting a false operation of the remaining interlock drums.

12. In a system of control, the combination with a supply circuit, a plurality of pairs of motors adapted to be connected to said supply circuit, a master controller, a main controller drum connected to each pair of motors, said drum having a number of series and parallel positions, an interlock drum connected to and controlling the operation of each main drum, and means comprising a plurality of train-line conductors for connecting the master controller to said interlock drums and for controlling the operation of the latter in accordance with the movement of the master controller, of a relay associated with each pair of motors for effecting a movement of the interlock drum from a series to a parallel position, said relays being connected to, and operated by, one of said train-line conductors.

13. In a system of control for a plurality of electric vehicles, the combination with a plurality of propelling motors for each of said vehicles, and a master controller, a main controller and a plurality of train-line conductors for governing the operation of said motors, of means comprising one of said train-line conductors and a number of relays inserted therein for effecting the transition of the main controller from the last series to the first parallel position.

14. In a system of control for a plurality of articulated vehicles, the combination with a plurality of motors for each of said vehicles and means comprising a plurality of train-line conductors for controlling the operation of said motors in series and in parallel relation, of means comprising one of said train-line conductors and a plurality of relays inserted therein for effecting a transition of said motors from series to parallel-circuit relation.

15. In a system of control for a number of articulated vehicles, the combination with a plurality of motors for each of said vehicles and means comprising a plurality of train-line conductors for controlling the operation of said motors, of means comprising one of said train-line conductors for effecting the transition of said motors from series to parallel relation and for preventing the completing of false circuits.

16. In a system of control for a number of articulated vehicles, the combination with a plurality of motors for operating said vehicles, and means comprising a plurality of train-line conductors and controlling devices for governing the operation of said motors, of means comprising relays fixedly connected to and operated by one of said train-line conductors for insuring the synchronous operation of said controlling devices.

17. In a system of control for a number of articulated vehicles, the combination with a plurality of motors for operating said vehicles, and means comprising a plurality of train-line conductors and controlling devices for governing the operation of said motors, of means comprising one of said train-line conductors for governing the operation of said controlling devices to effect the transition of said motors from series to parallel-circuit relation and to prevent the completing of false circuits.

In testimony whereof, we have hereunto subscribed our names this 7th day of Sept., 1916.

PAUL L. MARDIS.
ANDREW H. CANDEE.